United States Patent Office 3,361,650
Patented Jan. 2, 1968

3,361,650
PHTHALIC ANHYDRIDE TREATMENT IN THE PRESENCE OF HBr IN AN ALUMINUM VESSEL
Robert B. Egbert, Stamford, Conn., assignor to Chemical Process Corporation, Stamford, Conn., a corporation of Massachusetts
No Drawing. Filed Sept. 3, 1965, Ser. No. 485,115
10 Claims. (Cl. 203—86)

ABSTRACT OF THE DISCLOSURE

A process for recovering phthalic anhydride from a reaction product gas containing phthalic anhydride, HBr and water vapor and for refining the recovered crude phthalic anhydride containing HBr and chemically bound water, in which process apparatus made of aluminum or an aluminum alloy is used with substantial absence of free liquid water containing HBr in contact with the aluminum surfaces of such apparatus, to thereby minimize corrosion. The water is either chemically bound in the phthalic anhydride, in which case it does not exist as a free liquid in contact with the aluminum surfaces, or where the water exists as a vapor, this is achieved by keeping the temperature, at least where the aluminum surfaces contact the HBr and water vapor, above the dew point of the HBr and water vapor.

---

This invention relates to the recovery of phthalic anhydride (referred to hereinafter as PAA) from a reaction product, particularly a product gas, containing hydrogen bromide (HBr) and water, and to the refining of the crude PAA so recovered.

A commercially attractive method for making PAA is by the fluid bed, vapor phase catalytic oxidation of o-xylene with oxygen containing gas, e.g., air. The catalyst used is a vanadium oxide catalyst fluxed with a compound of $SO_3$ and alkali metal in a molar ratio substantially greater than one and supported on a silica gel support. PAA is also made by the vapor phase, fluid bed catalytic oxidation of naphthalene with air. In order to achieve adequate rates of reaction, yields and selectivity by the aforesaid oxidation of o-xylene to PAA, it is necessary to use a bromine promoter for promoting in the vapor phase the activation of the methyl groups of the o-xylene for selective oxidation to PAA. The promoter may be elemental bromine, HBr or bromine compounds which are capable of dissociation into bromine or HBr under reactor conditions. Bromine promoters have no activation effect and are not used in the aforesaid oxidation of naphthalene to PAA. Also, in the fluid bed oxidation of commercial o-xylene, about twice the weight of water is formed compared to naphthalene. At the same or slightly lower weight ratios of air to o-xylene, the product gas contains about the same concentration of PAA vapor, but about 70% to 100% higher concentration of water vapor.

The recovery and refining of the PAA from the product gas obtained by the aforesaid commercial oxidation of o-xylene with a bromine promoter, which product gas contains HBr and water vapor, presents serious problems due to rapid corrosion of construction materials, e.g., carbon steel and stainless steel, from which conventional recovery and refining equipment are made.

This rapid corrosion cannot be tolerated because the costly apparatus is seriously attacked and because the crude recovered PAA product is contaminated with the corrosion products. These corrosion products cause plugging of equipment and secondary corrosion when heated, which leads to a refined PAA product which may be off color or may acquire off color during storage. They are difficult to remove completely, and the removal thereof further increases the cost of the process substantially.

These corrosion problems are caused by the presence of HBr and water in the product gas and in the recovered crude PAA obtained from such gas. The presence of the HBr increases the observed rate of corrosion in the recovery and refining systems by a factor of 10 to 50 times.

It is believed that the troublesome corrosion products are highly colored complexes of bromine, iron and PAA, the iron being derived from the apparatus.

Crude PAA made by catalytic fluid bed oxidation of naphthalene with air is usually recovered from the product gas (the PAA normally constitutes less than two volume percent of the total product gas) by passing the product gas first through one or more liquid condensers maintained at a temperature at which crude PAA condenses out as a liquid and then through one or more solid condensers maintained at a temperature at which crude PAA condenses out as a solid. The solid PAA is melted out of the solid condensers and it, together with the liquid PAA condensed in the liquid condensers, comprises the major portion of the crude PAA recovered. The crude PAA is refined by chemical and/or heat treatment and is then further refined or purified by fractional distillation in the appropriate distillation apparatus. Inasmuch as PAA is a relatively non-corrosive material, these condensing, treating and distilling apparatus, as well as the necessary storage tanks, conduits, valves, pumps, etc., are made of carbon, or to a lesser extent stainless, steels.

However, when a bromine promotor is used in the catalytic, fluid bed, vapor phase oxidation of o-xylene to PAA (such a promoter is essential in this process), whether it be elemental bromine, HBr or an organic bromide, HBr is present in the product gas and is partly condensed in the liquid and solid condensers with the liquid and solid phthalic anhydride and causes corrosion of the carbon steel and stainless steel apparatus at an unacceptably high rate. Not only is the corrosion rate excessive, but the condensers become fouled with insoluble solid corrosion products (probably iron corrosion products). After three or four weeks of continuous operation, they are so encumbered with insoluble corrosion products that they are no longer operable.

In addition to the carbon steel and stainless steel liquid and solid condensers, the carbon steel and stainless steel conduits, pumps, meters, valves, storage tanks and other apparatus for handling the crude PAA during recovery and refining also corrode rapidly, as well as certain parts of the carbon and stainless steel distillation apparatus for refining the PAA. Before distillation, the crude PAA is preferably subjected to a prolonged heat and/or chemical refining treatment, e.g., in a heat treatment tank, to remove certain impurities, including the HBr and water which has combined with PAA to form phthalic acid (hereinafter referred to as PA), and corrosion of the apparatus used for treatment also occurs. These problems are not present in the recovery and refining of PAA from product gases made by the vapor phase oxidation of naphthalene or by the vapor phase oxidation of o-xylene without a bromine promoter.

Normally, when oxygen is present to maintain a protective film, type 316 stainless steel is a satisfactory material of construction in the presence of most acidic materials and even in the presence of halogen acids, when the latter are dilute enough. However, in the recovery and refining of crude PAA made by the aforesaid vapor phase, fluid bed catalytic oxidation of o-xylene using a bromine promoter, it was found that not only does Type 316 stainless steel corrode as rapidly as carbon steel, but it becomes badly pitted with the result that stainless steel condensers would fail even quicker than carbon steel. Such nonferrous metals as nickel and Monel, which are used successfully with halogenated organic compounds, showed unacceptable corrosion rates also.

Since a bromine promoter is essential to provide commercially practical reaction rates, PAA selectivities and yields in the vapor phase, catalytic fluid bed oxidation of o-xylene, and since such promoters result in unacceptably high rates of corrosion of the recovery and refining apparatus made of conventional materials, it is apparent that this corrosion problem must be solved before the vapor phase, fluid bed catalytic oxidation of o-xylene can become commercially feasible.

The present invention is effective to overcome and solve the aforesaid corrosion problems inherent in the aforesaid recovery of PAA.

These problems are overcome in accordance with the present invention by carrying out the PAA recovery processes in apparatus, e.g., liquid and solid condensers, which presents to the products being processed, surfaces of a metal of the group consisting of aluminum and an alloy thereof in which aluminum is the major constituent.

The present invention is also effective to overcome the aforesaid problems in refining the recovered crude PAA product.

These problems are overcome in accordance with the present invention by carrying out the crude PAA refining processes in apparatus, e.g., heat treating apparatus and/or distillation apparatus, which presents to the products being processed, surfaces of a metal of the group consisting of aluminum and an alloy thereof in which aluminum is the major constituent.

Preferred aluminum alloys are the commercially available alloys of aluminum with manganese, magnesium and silicon. However, commercial alloys of aluminum containing other metals such as nickel, chromium, titanium, copper and zinc can also be used. An alloy should be used which is structurally able to withstand the temperatures used in the recovery and refining processes. Pure aluminum has a melting point of 659° C. (1218° F.) but begins to lose its useful structural strength at about 400° F. However, certain aluminum alloys such as alloys of aluminum with manganese, magnesium and/or silicon can structurally withstand higher temperatures. In all these alloys, the major constituent, usually 90 or 95 weight percent or more, is aluminum. Although some of these alloys contain from 80 to 90% aluminum, these are less desirable because from a corrosion standpoint the purer the aluminum, the lower the rate of corrosion observed. Usually from 2 to 5 weight percent of alloying metals are sufficient to impart the necessary structural properties.

The solution of these problems in this manner is a most surprising discovery, since it is well known that aluminum and the commercially available aluminum alloys are rapidly corroded by solutions of halogen acids. For example, when a piece of aluminum is placed in hydrogen bromide solution, a rapid and vigorous attack occurs with the evolution of large amounts of hydrogen gas. In fact, the corrosion rate exceeds even that of carbon steel. From this, one would expect that aluminum might corrode more rapidly than carbon steel in the recovery and refining of PAA from reaction products containing in addition to the PAA, HBr and water. Surprisingly enough, it has been found that this is not true and that no appreciable corrosion of the aluminum occurs when apparatus having aluminum or aluminum alloy walls is used in these processes.

This discovery is even more surprising in view of the contrary indications in British Patent No. 845,038 which involves the liquid phase air oxidation of xylenes in carboxylic acid solution to phthalic acids, using metallic bromides as catalysts. This patent is based on the purported discovery that by adding fluoride ion to the reactor, the fluorine compound reacts with the stainless steel or aluminum walls of the reactor to form a tough fluoride film which is resistant to the phthalic acids, bromine compounds, water and liquid organic acid solvents present in the reactor. It was found, however, in this British patent, that without fluoride ions, the aluminum and stainless steel become badly corroded.

A sample of aluminum was immersed in molten phthalic anhydride maintained at a temperature of between 300° and 360° F. and to which one percent of a 48% aqueous solution of HBr had been added. The sample remained bright and shiny, and no perceptible corrosion occurred. When a test sample of carbon steel was subsequently immersed, the same molten PAA rapidly attained a deep reddish brown color (owing to the formation of a colored complex of the iron with bromine and PAA) and considerable weight loss occurred. Cupro-nickel, aluminum bronze (in which aluminum is a minor ingredient), and copper discolored the solution and were severely corroded. Table I below summarizes these results.

TABLE I

| Sample | Duration of Test (Hours) | Corrosion Rate, Inches/Year Penetration |
|---|---|---|
| Carbon Steel | 190 | 0.254 |
| Aluminum Bronze | 148.5 | 0.022 |
| Cupro-nickel (90-10) | 148.5 | 0.050 |
| Cupro-nickel (70-30) | 148.5 | 0.011 |
| Copper | 98 | 0.040 |
| Aluminum Alloy 1100 (99% Pure Aluminum)[1] | 77 | 0.0001 |
| Aluminum Foil (Reynolds Wrap which is an aluminum of high purity) | 184 | ([2]) |

[1] The number system for designating the various aluminums and aluminum alloys and the typical compositions thereof may be found on pages 8, 9, and 44-47 of the Alcoa Aluminum Handbook published in 1962 by Aluminum Company of America. A first digit of one indicates a relatively pure aluminum. Other first digits indicate the primary alloying metal. In all cases the major component (80% to 90% or more) is aluminum.
[2] Not measurable.

Samples of various metals were inserted in the liquid crude PAA condensate at a temperature of 275° F. in the liquid condenser in the recovery apparatus of a plant in which the PAA was made by the fluid bed, vapor phase, catalytic (vanadium oxide catalyst fluxed with a compound of $SO_3$ and alkali metal and supported on a silica gel support) oxidation of o-xylene with air (weight ratio of air to o-xylene fed to the reactor was about 10 or 11 to 1) in the presence in the vapor phase of elemental bromine and in which the product gas from the reactor, after filtering out entrained catalyst whereby the gas is diluted with blockback air, typically contained about 1.70 mole percent PAA vapor, 0.023 mol percent HBr, 9.6 mol percent water vapor, 3.31 mol percent $CO_2$, 1.09 mol percent CO, 8.9 mol percent $O_2$, 0.033 mol percent maleic anhydride vapor and the remainder nitrogen, except for traces of other compounds such as phthalide, benzoic acid and brominated organic compounds.

Table II below summarizes the results of these tests.

TABLE II

| Sample | Duration of Test (Hours) | Corrosion Rate, Inches/Year Penetration |
|---|---|---|
| Carbon Steel | 217 | 0.0210 |
| 316 Stainless Steel | 130 | [1] 0.023 |
| Monel | 217 | 0.0062 |
| Nickel | 217 | 0.0060 |
| Hastelloy C | 217 | 0.0009 |
| Titanium | 217 | [2] |
| Tantalum | 130 | [2] |
| Aluminum 1100 (99% pure aluminum) | 203 | [2] |
| Aluminum 5050 (magnesium alloy of aluminum)) | 203 | 0.003 |
| Aluminum 3004 (manganese alloy of aluminum) | 203 | 0.0016 |
| Aluminum 6061 (magnesium and silicon alloy of aluminum) | 203 | 0.0017 |
| Aluminum 5052 (magnesium alloy of aluminum) | 203 | 0.0002 |
| Aluminum 3003 (manganese alloy of aluminum) | 203 | 0.0029 |

[1] Badly pitted.  [2] Negligible.

Although the Hastelloy C, titanium and tantalum (see U.S. Patent No. 3,012,038) had satisfactory rates of corrosion, these metals are extremely costly and their extensive use in fluid bed phthalic anhydride plants would raise substantially the capital costs of such plants. Phthalic anhydride is a large volume, low-cost chemical and the use of high-priced materials of construction for large commercial apparatus cannot be economically justified in most cases. On the other hand, aluminum and commercial aluminum alloys are relatively plentiful and inexpensive and do not increase the capital cost of the plant substantially.

In Table II, it was noted that the stainless steel became badly pitted. Very significantly, there was no pitting of any of the aluminum samples of Tables I and II.

The rates of corrosion of Monel and nickel were relatively high, although not nearly as high as the carbon steel and stainless steel.

The surprisingly low corrosion rates of aluminum test samples were further verified by the use of a 3003 aluminum alloy (manganese alloy of aluminum) fin tube solid condenser and a 3003 aluminum alloy liquid condenser to replace a solid condenser and liquid condenser of carbon steel and Type 316 stainless steel, respectively, in a PAA pilot plant in which the PAA was made by the aforesaid vapor phase, catalytic oxidation of o-xylene with air using elemental bromine as a promoter and in which the uncondensed portion of product gas from the liquid condenser was passed to the solid condenser. The operating rate of the plant was 60 pounds per day of PAA. The product gas from the reactor was similar in composition to that referred to above with respect to Table II. The temperature of fluids leaving the liquid condenser was 275° F.–280° F. and of the solid condenser 180° F. The corrosion rates observed during extended periods of operation were comparable to those achieved with the aluminum alloys of Table II. Excessive pitting of the Type 316 stainless steel condenser occurred, whereas there was no pitting of the aluminum 3003 condensers. A comparison of the metal content (the amount of corrosive products) of the crude PAA produced by each condenser, which is a measure of the amount of corrosion, is set forth in the following Table III.

TABLE III

| Condenser | Material of Construction | Metal Content of Crude PAA (parts per million) |
|---|---|---|
| Liquid | Stainless Steel | 580 |
| Solids | Carbon Steel | 2,600 |
| Liquid | Aluminum 3003 | 11 |
| Solids | do | 10 |

The alloys of aluminum (e.g., Aluminum 3003) have better structural properties than pure aluminum at the temperatures and other conditions used. However, from a practical standpoint, the corrosion rate is about the same.

Table III demonstrates the amazing decrease in undesirable corrosion products by the use of aluminum.

It is well known that aluminum is fundamentally a very active metal. It is more electronegative than iron and heavy metals and is exceeded in reactivity by only magnesium, the alkali metals and the alkaline earth metals. However, it exhibits corrosion resistance to a variety of materials (such as water) because of the formation of a tightly adhering film of aluminum oxide which protects the metal. A similar phenomenon of protective oxide film explains the corrosion resistance of stainless steel. Under certain circumstances, when the oxide film is destroyed in local areas, e.g., by amalgamating with mercury, the aluminum is attacked by water and corrosion results. Halogen compounds are noted for provoking this pitting type corrosion of aluminum and the austenitic stainless steels. In ordinary warm sea water, for example, both materials are subject to pitting corrosion which destroys their usefulness, even though overall weight loss due to corrosion is not too excessive. In sea water, the pitting is more severe with aluminum than stainless steel. Thus, it was not surprising that the stainless steel condenser of Table III, in which PAA, HBr and water were present, was pitted or that the stainless steel sample of Table II suspended in the crude PAA condensate in such condenser, was pitted. However, examination of the aluminum samples and also the aluminum condensers referred to above did not reveal the slightest evidence of pitting corrosion. This was completely unexpected and could not be anticipated from any present theory of corrosion.

In the condensers, the water exists as a vapor in the vapor phase of the product gas. The PAA condenses as a liquid or solid on the walls of the condenser and the water vapor in the product gas upon coming in contact with the condensed liquid or solid PAA chemically combines with some of the PAA to form phthalic acid (PA), some or all of which becomes dissolved in the molten PAA. Any PA which precipitates after reaching saturation remains suspended in the PAA. Some of the HBr present in the vapor phase is also taken up by the crude PAA and passes out of the condensers with the crude PAA. It is this HBr which is highly corrosive to carbon and stainless steels. All the water present in the crude PAA is chemically bound water in the form of PA (or other organic acids such as fumaric) which, because it is dissolved and/or suspended in the PAA, does not exert a corrosive effect. In fact, it is believed that water cannot exist as free water (as distinct from chemically bound water) when in contact with an excess of PAA because it is immediately converted to PA, which in turn is dissolved and/or suspended in the PAA.

When the crude molten PAA is refined at elevated temperatures in the heat treatment or stripping tank, which can be made of aluminum or an aluminum alloy in accordance with the present invention, the heat drives off or frees the bound water in the PA to form free water vapor and PAA. The heat also drives off the HBr contained in the crude PAA and the HBr vapor and water vapor are removed from the system. Conditions in the heat treatment tank and vapor removal system are controlled to drive off completely the water and HBr as aforesaid, but to minimize vaporization of the molten PAA. A reflux condenser can be used for this purpose, also having surfaces of aluminum or an alloy thereof.

Since in the oxidation of o-xylene there is more water in the product gas as compared to the oxidation of naphthalene, a greater amount of PA is formed in the condensers, and hence a greater amount of water must be driven off in the heat treatment of the crude PAA.

Any undesired residual traces of HBr and water (in the form of PA) remaining in the crude PAA after the heating treatment are subsequently driven off as vapor in the distillation apparatus ahead of the PAA. Consequently, it is preferred to protect the parts of this apparatus in which such HBr and water might be present in substantial concentration, such as condenser and condensate handling equipment, by employing aluminum or an alloy thereof in accordance with this invention. By the time the crude PAA reaches the distillation apparatus, all of the HBr should have been removed. However, the use of aluminum ensures against corrosion in the event of operating failure.

It is important in carrying out the PAA recovery and refining processes of the present invention that no substantial amount of free liquid water containing HBr come in contact with the aluminum or aluminum alloy surfaces. Otherwise, increased corrosion will occur. On the other hand, free water and HBr in the vapor phase and in the presence of PAA, or chemically bonded water, as in PA, together with HBr and in the presence of molten or solid PAA does not cause objectionable corrosion of the aluminum surfaces.

The substantial absence of free liquid water containing HBr and in contact with the aluminum or aluminum alloy surfaces can be ensured by keeping such surfaces at a temperature above the dew point of any free water and HBr in the product being processed so long as there is any substantial amount of HBr present, i.e., so long as the HBr is present in corrosive amounts. If the temperature of such surfaces is at or below such dew point, the HBr and water condenses, and in the absence of a large excess of PAA to react with the water, the aluminum corrodes at a substantially increased rate.

HBr and water form a maximum boiling azeotropic mixture so that as the temperature of the product gas being processed is decreased to and below the azeotropic dew point of the HBr and free water contained therein, the HBr and water condense out as an azeotropic mixture until the one which is present in the smallest amount (in this case HBr) is all condensed whereafter the other one condenses at a lower temperature.

The azeotropic dew point of HBr and water for any particular system in accordance with the present invention can be determined by observation in two ways: one, by observing the rate of corrosion and appearance of the corrosion products and, secondly, by analysis of the concentration of corrosion products. It can also be easily calculated by conventional techniques knowing the basic thermodynamic data including enthalpies, pressure and the concentration of water, PAA, HBr and other components of the system.

The azeotropic dew point of the HBr and water is higher than that of water alone, other factors being equal.

With the reactor product gas referred to above with reference to Table II, the azeotropic dew point of the water and HBr was about 73° C. or 163° F. at a pressure of about 5 p.s.i.g. However, as aforesaid, the dew point will vary, depending on system pressure and concentrations of water, HBr, PAA and other components.

The dew point of the HBr and water will depend not only on system pressure but also on the ratio of air to o-xylene and on the selectivity achieved in the oxidation reaction. Higher air ratios result in the product gas being more dilute in water and HBr which lowers the dew point. Lower selectivities result in a greater amount of water in the product gas which increases the dew point. Similarly, a lower purity of o-xylene feed leads to an increase in water and in dew point. This is understandable, since the dew point depends on the partial pressure of the water and the presence of HBr.

In order to ensure against corrosion, the aluminum surfaces should be maintained at a safe temperature (at least 5° to 20° C. or 9° to 36° F.) above the dew point of the azeotropic HBr and water. For example, if the dew point is 73° C. or 163° F., the temperature of the aluminum surfaces could be held, for example, at 82° C. or 180° F.

Of course, the operating temperature in the liquid condenser must be above and the temperature in the solids condenser must be below the melting point of PAA (131° C. or 268° F.).

To demonstrate the effect of an aluminum surface temperature below the dew point of the HBr and water in which liquid water containing HBr condensed out and came in contact with the aluminum surfaces because there was an insufficient amount of condensed PAA to combine with the water, the concentration of aluminum (this is a measure of the corrosion products and hence of corrosion) in the crude PAA product condensed in the solid aluminum condenser of Table III was compared at a condensing temperature of 82° C. (180° F.) at the outlet, which was above the dew point of the azeotropic water and HBr contained in the product gas, and at 71° C. (160° F.) at the outlet, which was below the dew point of the azeotropic water and HBr. At a condensing temperature of 82° C., the concentration of aluminum analyzed in the crude PAA in parts per million was between 12 and 23 and at 71° C. it was between 909 and 1034.

It was observed in the latter case that almost all the corrosion occurred in a relatively small fraction of the total condenser surface area, namely at the outlet end, because at that area the temperature of the aluminum surface was below the dew point of the HBr and water and the amount of condensed PAA was relatively small. At the other areas, the temperature of the aluminum surfaces was above such dew point and also there was an excess of condensed PAA. Thus, the amount of metal found in the crude PAA product when melted out of the solid condenser only partially reflects the increase in severity of attack.

Because the melting point of PAA is about 131° C. (268° F.), which is well above the dew point of the HBr and water, there is no danger of the temperature in the liquid condenser approaching such dew point. However, in the low temperature outlet end of the solid condenser, where the PAA concentration is very low, and generally in the portions of the recovery and refining system in which the water exists with the HBr in free form as distinguished from being bound in the form of PA, as for example in the equilibrium vapor phase in the heat and/or chemical treatment tank, it is essential that the aluminum surface temperature be above the dew point of the water and HBr. On the other hand, where it exists in chemically bound form, this is not important.

In carrying out the recovery and refining processes of the invention, the apparatus used (e.g., liquid and solid condensers, reflux condensers, heat and/or chemical treatment tank, distillation apparatus, conduits, valves, meters, gauges, storage tanks, pumps, filters, cyclones, etc.) can be made of aluminum or an aluminum alloy or the surfaces thereof presented to i.e., contacted by, the products being processed may be lined with aluminum or an aluminum alloy. Aluminum or aluminum alloy clad materials can be used. In this manner, the loss of structural strength by aluminum and alloys thereof can to a large extent be offset.

After all the HBr has been removed from the crude PAA in accordance with the present invention, it is no more corrosive to carbon and stainless steels than crude PAA obtained in o-xylene oxidation processes conducted without the addition of a bromine promoter.

I claim:

1. In a process for recovering phthalic anhydride from a reaction product containing phthalic anhydride, hydrogen bromide and water vapor, said reaction product being a product gas forwarded to a condenser in the process for condensation of the phthalic anhydride from the product gas, the improvement comprising carrying out said process in apparatus which presents to said process, surfaces of a metal of the group consisting of aluminum and an alloy thereof in which the major constituent is aluminum, said process being carried out in the substantial absence of free liquid water containing HBr in contact with said surfaces.

2. In a process according to claim 1, said aluminum alloy being an alloy of aluminum and a metal of the group consisting of manganese, magnesium and silicon.

3. In a process according to claim 1, said apparatus being a liquid condenser to condense liquid phthalic anhydride from said product gas.

4. In a process according to claim 1, said apparatus being a solid condenser to condense solid phthalic anhydride from said product gas.

5. In a process according to claim 1, the temperature, at least where said surfaces contact the HBr and water in the form of vapor, being substantially above the dew point of the HBr and water vapor.

6. In a process for the refining of a crude phthalic anhydride product containing phthalic anhydride, hydrogen bromide and chemically bound water, said process including the heat treatment of said crude phthalic anhydride followed by distillation thereof, the improvement comprising carrying out said process in apparatus which presents to said process, surfaces of a metal of the group consisting of aluminum and an alloy thereof in which the major constituent is aluminum, said process being carried out in the substantial absence of free liquid water containing HBr in contact with said surfaces.

7. In a process according to claim 6, said apparatus comprising a stripping tank in which the crude phthalic anhydride product is heated to remove impurities, including said water and HBr.

8. In a process according to claim 6, said apparatus comprising distillation apparatus.

9. In a process according to claim 6, the temperature, at least where said surfaces contact the HBr and water in the form of a vapor, being substantially above the dew point of the HBr and water vapor.

10. In a process according to claim 6, said aluminum alloy being an alloy of aluminum and a metal of the group consisting of manganese, magnesium and silicon.

References Cited

UNITED STATES PATENTS

| | | | |
|---|---|---|---|
| 2,072,053 | 2/1937 | Hendry | 203—86 X |
| 2,091,289 | 8/1937 | Porter | 260—346.7 |
| 2,283,209 | 5/1942 | Hull et al. | 23—260 |
| 2,543,971 | 3/1951 | Houpt et al. | 203—86 X |
| 2,850,440 | 9/1958 | Shrader et al. | 203—86 X |
| 2,954,385 | 9/1960 | Burney et al. | 260—346.8 |

FOREIGN PATENTS

| | | |
|---|---|---|
| 449,621 | 6/1936 | Great Britain. |
| 795,999 | 6/1958 | Great Britain. |

OTHER REFERENCES

Encyclopedia of Chemical Technology, 1948, vol. 2, page 633.

NORMAN YUDKOFF, *Primary Examiner.*

F. E. DRUMMOND, *Assistant Examiner.*